Jan. 26, 1960  F. G. HAFFNER  2,922,266
CONVEYING APPARATUS
Filed May 17, 1956  4 Sheets-Sheet 3

INVENTOR.
Fred G. Haffner
BY
J. Stanley Churchill
ATTORNEY

Jan. 26, 1960   F. G. HAFFNER   2,922,266
CONVEYING APPARATUS
Filed May 17, 1956   4 Sheets-Sheet 4

INVENTOR.
Fred G. Haffner
BY
J. Stanley Churchill
ATTORNEY

United States Patent Office
2,922,266
Patented Jan. 26, 1960

2,922,266

CONVEYING APPARATUS

Fred G. Haffner, South Braintree, Mass., assignor to Pneumatic Scale Corporation, Limited, Quincy, Mass., a corporation of Massachusetts Application May 17, 1956, Serial No. 585,543

2 Claims. (Cl. 53—387)

The invention relates to conveying apparatus for packages.

The invention has for an object to provide novel and improved apparatus for conveying packages having adhesively sealed folding flaps and wherein provision is made for maintaining pressure against the adhesively coated flaps folded against the top, bottom and side walls of the package whereby to set the adhesive and provide a firm seal during the advance of the package through the conveyor.

With this general object in view and such others as may hereinafter appear, the invention consists in the conveying apparatus and in the various structures, arrangements and combinations of parts hereinafter described and particularly defined in the claims at the end of this specification.

In the drawings illustrating the preferred embodiment of the invention:

Figure 1:
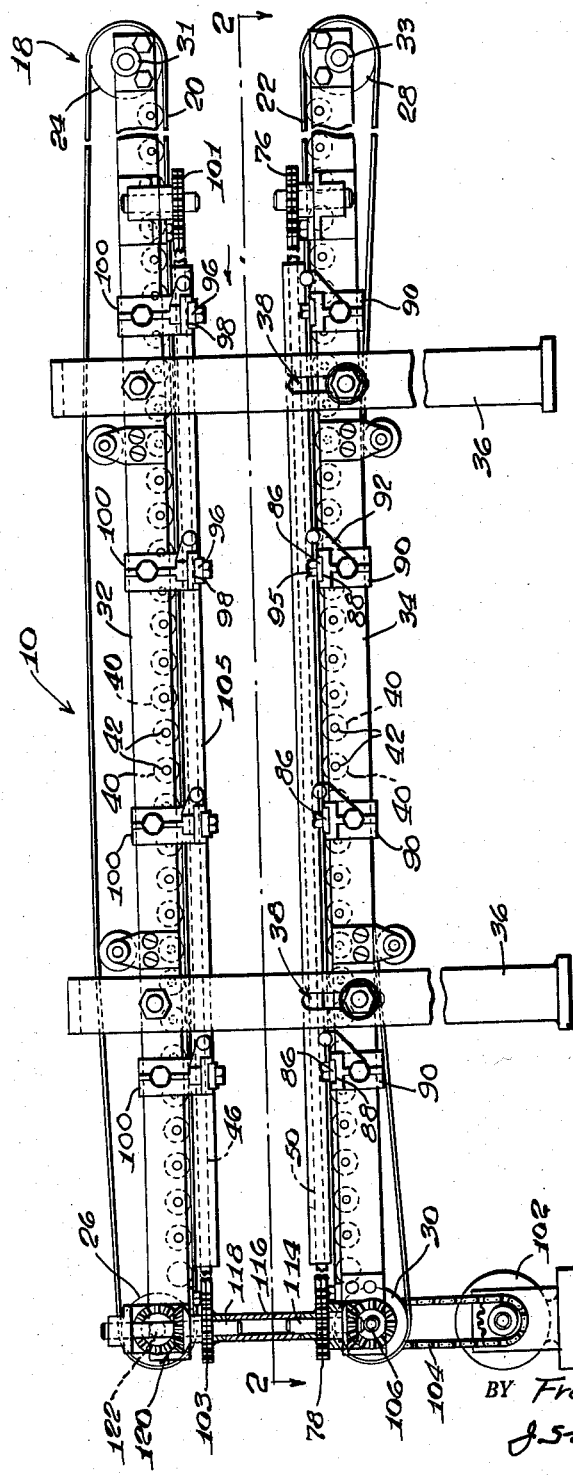
Fig. 1 is a side elevation of conveying apparatus embodying the present invention.

In general the present invention contemplates conveying apparatus of the type embodying upper and lower belts for use with a packaging machine wherein a package comprising a filled carton having its closing flaps folded and adhesively secured is transferred from the packaging machine to be received between the upper and lower belts to apply continuous pressure upon the ends of the cartons to firmly set the adhesively sealed flaps while the adhesive is drying during conveyance of the cartons to the discharge end of the conveyor. Such conveying apparatus is referred to generally in the packaging trade as a "dryer," and in accordance with the present invention provision is made for handling cartons provided with laterally extended flaps at one or both ends of the carton and which are folded and adhesively secured to the outer side walls of the carton. In practice the laterally extended flaps are provided with a coating of adhesive and folded against the side walls of the carton in the packaging machine, and provision is made in the present conveying apparatus for maintaining a continuous lateral pressure against the folded side flaps and also continuous vertical pressure against the top and bottom folded flaps to firmly set the adhesive during the travel of packages through the conveying apparatus.

Referring now to the drawings, the present conveying apparatus, indicated generally at 10, is adapted to handle cartons 12 having the usual top and bottom closing flaps and laterally extended tabs or flaps 14, 16 at the top and bottom of the carton respectively. All of the flaps are provided with a coating of adhesive on their inner surfaces and are folded against the top, bottom and sides of the carton during their travel through the packaging machine and prior to transfer of the carton to the conveying apparatus.

The cartons thus prepared are presented to the conveying apparatus 10 at the receiving end 18 in an upright position between upper and lower belts 20, 22. The upper belt 20 is arranged to run over pulleys 24, 26 at opposite ends of the conveyor, and the lower belt 22 is arranged to run over similar pulleys 28, 30. The pulleys are fast on their respective shafts which are mounted to rotate in bearings 31, 33 secured to upper and lower horizontal frame members 32, 34. The horizontal frame members are secured to upright supporting frame members 36. As illustrated in Fig. 1, the lower frame member 34 may be adjustably secured to their upright frame members by means of elongated slot connections 38 so as to permit vertical adjustment of the lower belt 22 relative to the upper belt 20 to change the spacing between the belts whereby to accommodate cartons of different heights. A series of rollers 40 mounted to rotate on shafts 42 supported between the horizontal frame members 32, 34 serve as backing rollers for the belts so as to maintain a continuous pressure against the top and bottom flaps of the cartons as they are advanced through the conveyor.

Figure 4:
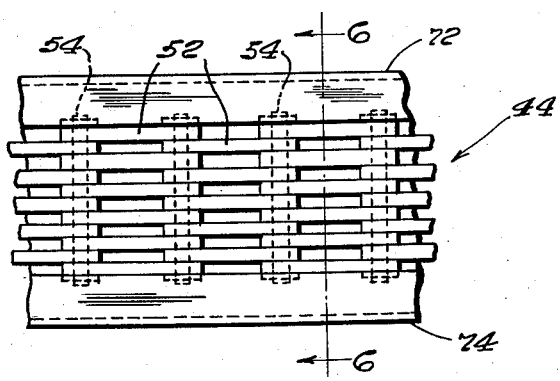
Fig. 4 is a side elevation detail of a portion of the flap pressing chain.
Figure 6:
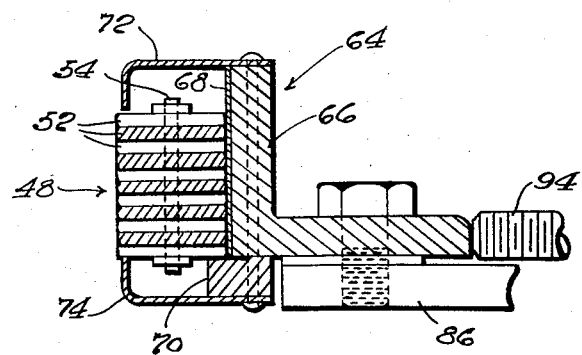
Fig. 6 is a cross sectional view taken on the line 6—6 of Fig. 4.

The elongated upper and lower pressure applying belts 20, 22 are arranged to be driven at the same speed in parallel relation and in substantially horizontal planes, as shown, and in accordance with the present invention in order to maintain a continuous pressure against the side flaps 14, 16 to press them against the side walls of the cartons two pairs of opposed side chains are provided, the upper pair of side chains 44, 46 bearing against opposed side flaps 14 and the lower pair 48, 50 bearing against opposed side flaps 16. As shown in detail in Figs. 4 and 6, each chain is made up of a plurality of superposed and alternately spaced links 52 connected by pins 54 providing a substantially flat face on one side for engagement with the opposed side flaps and walls of the cartons, the other side of the chain being shaped for driving engagement with sprockets arranged to rotate on vertical axes as shown in Fig. 1.

Figure 2:
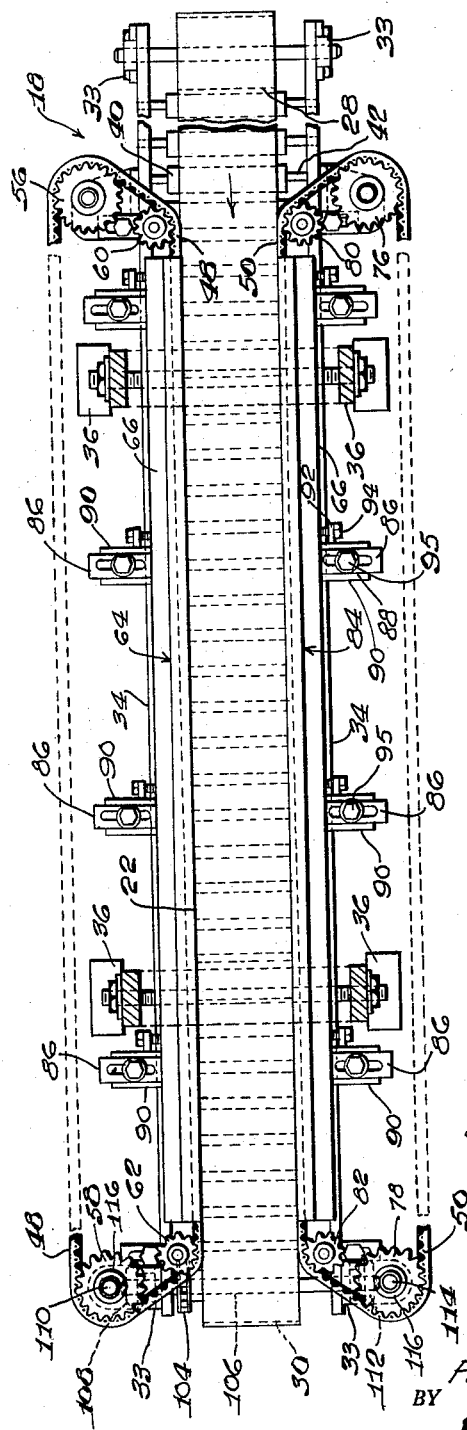
Fig. 2 is a plan view of the lower portion of the conveyor as seen from the line 2—2 of Fig. 1

As seen in Fig. 2, one of the lower pair of opposed chains, 48, is arranged to run over sprockets 56, 58 at each end of the conveyor and also over idler sprockets 60, 62 arranged to align the inner run of the chain with a supporting track indicated generally at 64 which also serves as a backing member for the chain to cause it to effect a pressure against the side walls and flaps of the carton. As shown in detail in Fig. 6, each supporting track 64 comprises an elongated angle member 66 having a wear strip 68 secured to one face thereof, and an elongated bottom rail 70 secured to the angle member 66, a portion of the bottom rail extending laterally beyond the wear face 68 to provide a bearing surface upon which one lower edge of the chain is supported. Upper and lower elongated shield members 72, 74 may be extended from the top of the angle member 66 and the bottom of the rail 70 respectively, the shield members being bent at right angles, as shown, providing an opening through which the inner run or carton engaging face of the chain extends, the lower shield member 74 serving to support the other lower edge of the chain.

Figure 3:
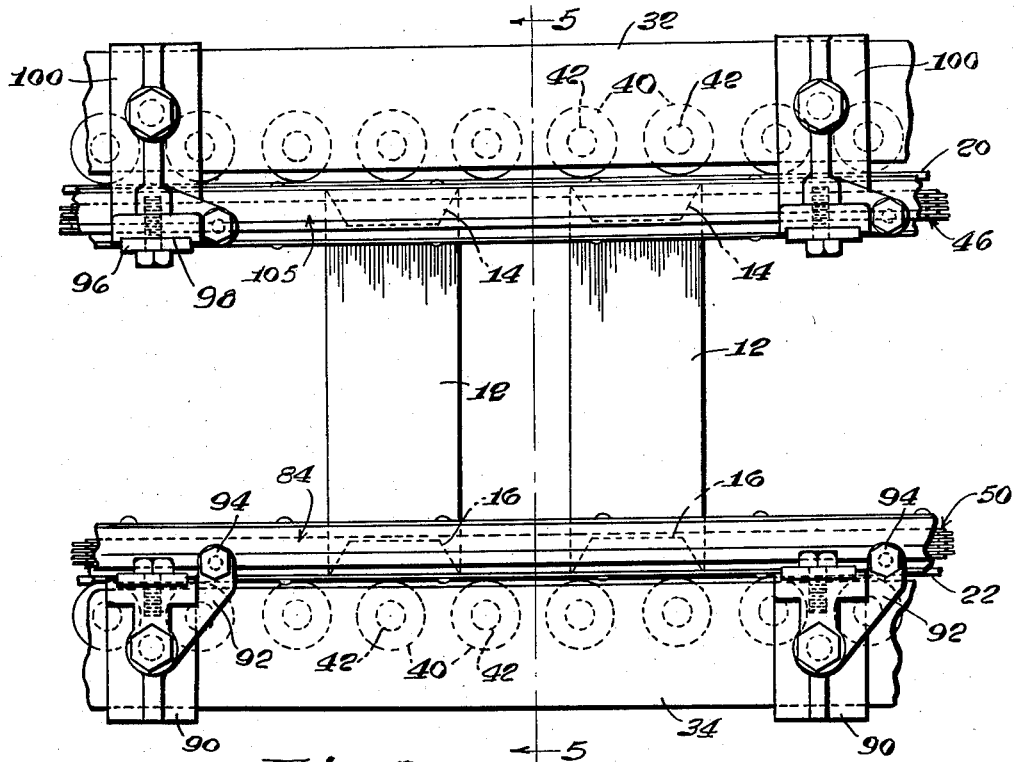
Fig. 3 is an enlarged detail view in side elevation of a portion of the present conveying apparatus.
Figure 5:
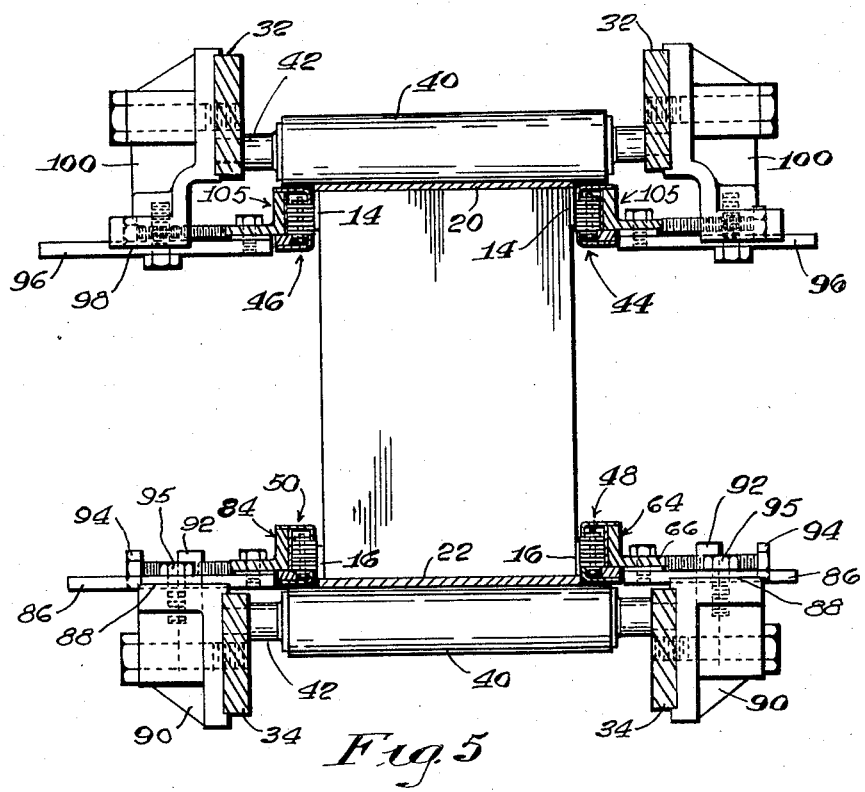
Fig. 5 is a cross sectional view taken on the line 5—5 of Fig. 3.

The opposing chain 50 of the lower pair of opposed pressure applying chains is similarly arranged to run over end sprockets 76, 78 and idler sprockes 80, 82 to align the inner run of the chain with a similar supporting track and backing member, as indicated generally at 84 in Fig. 2, for pressing engagement with the opposite side of the carton. As shown in Figs. 3 and 5, each chain supporting track is mounted for adjustment inwardly and outwardly to accommodate cartons of different widths, each track being provided with a plurality of laterally extended members 86 attached thereto and which are adjustably received in grooves 88 provided in brackets 90 secured to the side rails 34. The laterally extended members 86 are slotted for adjustment in the grooves 88, and in order to provide a fine adjustment to regulate the pressure against the sides of the cartons each bracket 90 is provided with an extension 92 in which a set screw 94 is mounted for adjustable engagement with the edge of the horizontal leg of the angle member 66 as shown. Thus, in practice rotation of the set screws 94 will move the track supporting rails inwardly to obtain a predetermined lateral pressure of the chains against the cartons whereupon the laterally extended slotted members 86 may be secured in their adjusted positions by the bolts 95. As indicated in Fig. 2, the idler sprockets 60, 62 and 80, 82 may be similarly mounted for adjustment laterally of the conveyor to conform to the adjusted position of the chain supporting tracks 64, 84 of the lower pair of opposed pressure applying chains 48, 50 respectively.

As illustrated in Figs. 1 and 5, the upper pair of opposed side pressure applying chains 44, 46 may be similarly arranged to run over end sprockets 101, 103 and over similar idler sprockets. As shown, the chain supporting structures are mounted in an inverse position, the laterally extended members 96 being received in grooves 98 formed in the underside of brackets 100 secured to the horizontal supporting rails 32, and the chains being supported in the track members indicated generally at 105.

Referring now to Figs. 1 and 2, provision is made for driving the upper and lower opposed belts 20, 22 and the two pairs of opposed side pressure chains at the same rate of speed to advance the cartons through the apparatus while applying pressure to the ends and sides thereof. As herein shown, the drive connections include a motor 102 connected by a chain and sprocket drive 104 to a shaft 106 on which the pulley 30 is mounted for driving the lower belt 22. The shaft 106 is connected by bevel gears 108 to a vertical shaft 110 on which the sprocket 58 is mounted for driving the pressure applying chain 48 on one side of the apparatus. The shaft 106 is also connected by similar bevel gears 112 to a vertical shaft 114 on which the sprocket 78 is mounted for driving the pressure applying chain 50 on the other side of the apparatus. In order to drive the upper belt 20 and opposed chains 44, 46 each vertical shaft 110, 114 is connected by a coupling 116 to a similar shaft 118 arranged in an inverted position and which may be connected by bevel gears 120 to drive the horizontal shaft 122 on which the pulley 26 is mounted. The coupling members 116 are preferably arranged to permit vertical adjustment of the lower drive unit relative to the upper to correspond to the adjustment for spacing the belts 20, 22 for different heights of cartons.

As illustrated in Fig. 2, it will be observed that the receiving end of opposed side pressure applying chains is disposed forwardly of the receiving end of the upper and lower top and bottom pressure applying belts, and that the idler sprockets of opposed pressure applying chains are disposed relative to the driving sprockets in a manner such as to provide a converging portion at the receiving end of the apparatus and a diverging portion at the discharge end of the apparatus to facilitate entrance and discharge of the cartons into and out of the conveyor. It will be further observed that the upper and lower pressure applying belts and the opposed side pressure applying chains are all arranged to release their grip on the carton simultaneously at the discharge end of the apparatus. In practice the sealed packages may be manually removed from the discharge end of the apparatus by the operator or they may be transferred onto a packing table, not shown. While the side pressure applying elements are herein shown and described as comprising linked elements or chains, it is not desired to limit the invention in this respect.

From the above description it will be seen that the present conveying apparatus is particularly adapted for applying pressure to the top and bottom ends of the carton and to two opposed sides of the carton to maintain the adhesively coated flaps in firm engagement with the ends and sides during the advance of the carton to set the flaps, the present structure of the pressure applying side chains being arranged to apply a positive and continuous pressure against the side flaps to provide a firm and efficient seal.

While the preferred embodiment of the invention has been herein illustrated and described, it will be understood that the invention may be embodied in other forms within the scope of the following claims.

Having thus described the invention, what is claimed is:

1. Conveying apparatus for simultaneously setting the adhesive of folded and adhesively secured carton flaps against the top, bottom and two opposed side walls of a carton as the cartons are advanced through the apparatus, said flaps including top and bottom end flaps folded against said opposed side walls, said apparatus comprising a pair of spaced and parallel upper and lower belts engageable with and mounted to apply pressure against the tops and bottoms of the cartons, upper and lower means for independently supporting said belts in spaced relation including means for vertically adjusting one of the belts relative to the other to accommodate cartons of different heights, upper and lower pairs of opposed endless pressure applying chains mounted to move in a horizontal plane to apply continuous pressure laterally against said opposed side walls, said chains comprising a plurality of superposed and alternately spaced links and having a flat engaging face of substantial width directly engageable with the flaps being pressed against opposed side walls of the carton, said upper and lower pairs of opposed chains being carried by said upper and lower independent supporting means respectively, one pair of said chains being movable with said one belt during adjustment of the supporting means, elongated guide tracks carried by said supporting means comprising backing members for maintaining the chains in continuous firm and non-yieldable pressing engagement with the sides of the cartons, means for adjusting said guide tracks laterally of the apparatus to accommodate cartons of different width, and a common driving means interconnecting said belts and chains including adjustable coupling means between said upper and lower independently supported means adapted to maintain said driving means in interconnected relation during vertical adjustment of said supporting means.

2. Conveying apparatus as defined in claim 1 wherein the means for adjusting the guide tracks laterally includes a slotted adjustment connection between the guide track and its support, and a threaded adjusting member supported for engagement with said track for adjusting the same in its slotted connection.

References Cited in the file of this patent

UNITED STATES PATENTS

| | | |
|---|---|---|
| 1,066,193 | Ferguson | July 1, 1913 |
| 1,840,410 | Robinson | Jan. 12, 1932 |
| 1,854,075 | Smith et al. | Apr. 12, 1932 |
| 1,969,581 | Rose | Aug. 7, 1934 |
| 2,036,643 | Richard | Apr. 7, 1936 |
| 2,135,806 | Fermann et al. | Nov. 8, 1938 |
| 2,263,739 | Rose | Nov. 25, 1941 |
| 2,266,054 | Lowey et al. | Dec. 16, 1941 |
| 2,727,345 | Schoppee | Dec. 20, 1955 |
| 2,801,507 | Claus | Aug. 6, 1957 |